US011593048B2

(12) United States Patent
Ullmann et al.

(10) Patent No.: US 11,593,048 B2
(45) Date of Patent: *Feb. 28, 2023

(54) INTELLIGENT SESSION MANAGEMENT SYSTEM FOR A MULTIFUNCTION DEVICE

(71) Applicant: Xerox Corporation, Norwalk, CT (US)

(72) Inventors: Noah John David Ullmann, Rochester, NY (US); Keith S. Watson, Spencerport, NY (US); John F. Whiting, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/644,241

(22) Filed: Dec. 14, 2021

(65) Prior Publication Data
US 2022/0107769 A1 Apr. 7, 2022

Related U.S. Application Data

(62) Division of application No. 16/739,227, filed on Jan. 10, 2020, now Pat. No. 11,237,781.

(51) Int. Cl.
G06F 3/12 (2006.01)
H04N 1/44 (2006.01)
H04L 9/40 (2022.01)

(52) U.S. Cl.
CPC .......... G06F 3/1238 (2013.01); G06F 3/1222 (2013.01); H04L 63/08 (2013.01); H04N 1/4426 (2013.01); H04N 2201/0094 (2013.01)

(58) Field of Classification Search
None
See application file for complete search history.

(56) References Cited

U.S. PATENT DOCUMENTS

| 9,609,068 | B2 | 3/2017 | Michimura et al. |
| 9,609,515 | B2 | 3/2017 | Tredoux et al. |
| 10,051,019 | B1 | 8/2018 | Jasso et al. |
| 10,194,297 | B2 | 1/2019 | Sasaki et al. |
| 2013/0318144 | A1 | 11/2013 | Itami |

(Continued)

OTHER PUBLICATIONS

U.S. Appl. No. 16/739,227, filed Jan. 10, 2020, Intelligent Session Management System for a Multifunction Device.

Primary Examiner — Lennin R RodriguezGonzalez
(74) Attorney, Agent, or Firm — Fox Rothschild LLP

(57) ABSTRACT

A system for performing multifunction device session management includes a multifunction device and a computer-readable storage medium that includes one or more programming instructions. The one or more programming instructions cause the multifunction device to detect by one or more sensors of the multifunction device an indication that a session is to be initiated, in response to detecting the indication that the session is to be initiated, initiate the session, retrieve a device policy associated with the multifunction device from a data store associated with the multifunction device, identify a condition from the device policy, monitor for the occurrence of one or more triggers during the session, wherein each trigger is associated with the identified condition in the device policy, and in response to detecting that one or more of the triggers have occurred at the multifunction device, perform one or more actions pertaining to completion of the session.

22 Claims, 4 Drawing Sheets

(56) References Cited

U.S. PATENT DOCUMENTS

2014/0092431 A1\* 4/2014 Okuno .................. G06F 3/1292
358/1.15
2018/0338061 A1 11/2018 Ebner
2019/0253456 A1 8/2019 Wang \* cited by examiner

INTELLIGENT SESSION MANAGEMENT SYSTEM FOR A MULTIFUNCTION DEVICE

CROSS-REFERENCE AND CLAIM OF PRIORITY

This patent application claims priority to and is a divisional of U.S. patent application Ser. No. 16/739,227 filed Jan. 10, 2020, the entirety of which is incorporated herein by reference.

BACKGROUND

Due to an increased concern around security, users are increasingly required to enter credentials, such as a user name and password, to access multifunction devices. In addition, users are often asked to log into additional device-supported systems such as remote repositories and accounting systems. For efficiency, a system may temporarily maintain user credentials for all logged in systems for an entire session. This approach makes it the responsibility of a user to end his or her session, for example by logging out of a device or account, in order to prevent the next user from accidentally or maliciously accessing resources using the user's credentials. However, current session management systems only terminate sessions based on timers, which only provide basic security.

SUMMARY

This disclosure is not limited to the particular systems, methodologies or protocols described, as these may vary. The terminology used in this description is for the purpose of describing the particular versions or embodiments, and is not intended to limit the scope.

As used in this document, the singular forms "a," "an," and "the" include plural references unless the context clearly dictates otherwise. Unless defined otherwise, all technical and scientific terms used in this document have the same meanings as commonly understood by one of ordinary skill in the art. As used in this document, the term "comprising" means "including, but not limited to."

In an embodiment, a system for performing multifunction device session management includes a multifunction device and a computer-readable storage medium that includes one or more programming instructions. The one or more programming instructions, when executed, cause the multifunction device to detect by one or more sensors of the multifunction device an indication that a session is to be initiated, in response to detecting the indication that the session is to be initiated, initiate the session, retrieve a device policy associated with the multifunction device from a data store associated with the multifunction device, identify a condition from the device policy, monitor for the occurrence of one or more triggers during the session, wherein each trigger is associated with the identified condition in the device policy, and in response to detecting that one or more of the triggers have occurred at the multifunction device, perform one or more actions pertaining to completion of the session.

The system may detect that a session is to be initiated by receiving one or more user credentials via a user interface of the multifunction device. Alternatively, the system may detect that a session is to be initiated by detecting, by a proximity sensor of the multifunction device, that an object is within a certain distance from the proximity sensor. The system may detect that a session is to be initiated by receiving an indication from a mobile electronic device.

The system may identify a role associated with a user of the multifunction device, monitor for the occurrence of the one or more triggers during the session by monitoring whether an indication to begin a print job is received at the multifunction device, and automatically cause a notification to be displayed on a display device of the multifunction device, where the notification prompts the user to reset the output setting.

The system may identify a log-in status of a user of the multifunction device, monitor for whether a print job is a secure print job, and automatically end the session when processing of the print job is completed, monitor whether an indication to begin a print job is received at the multifunction device, and automatically cause a notification to be displayed on a display device of the multifunction device, where the notification prompts the user to log out.

The system may identify a target role, receive, via an input device of the multifunction device, one or more user credentials associated with a user of the multifunction device, identify a role associated with the user by comparing at least a portion of the user credentials to information stored by a user management system associated with the multifunction device, determine whether the target role corresponds to the role that is identified as being associated with the user, monitor, by a timer of a multifunction device, an amount of time during the session that the multifunction device is idle, and automatically cause a notification to be displayed on a display device of the multifunction device in response to the amount of time exceeding a threshold value associated with the target role, wherein the notification prompts the user to log out.

The system may perform, by an optical character recognition system associated with the multifunction device, image processing on at least a portion of a print job to determine whether the print job contains personally identifiable information. The system may, in response to determining that the print job contains personally identifiable information, automatically cause a notification to be displayed on a display device of the multifunction device, where the notification prompts the user to confirm that processing of the print job should continue despite the presence of personally identifiable information.

DETAILED DESCRIPTION

Figure 1A:
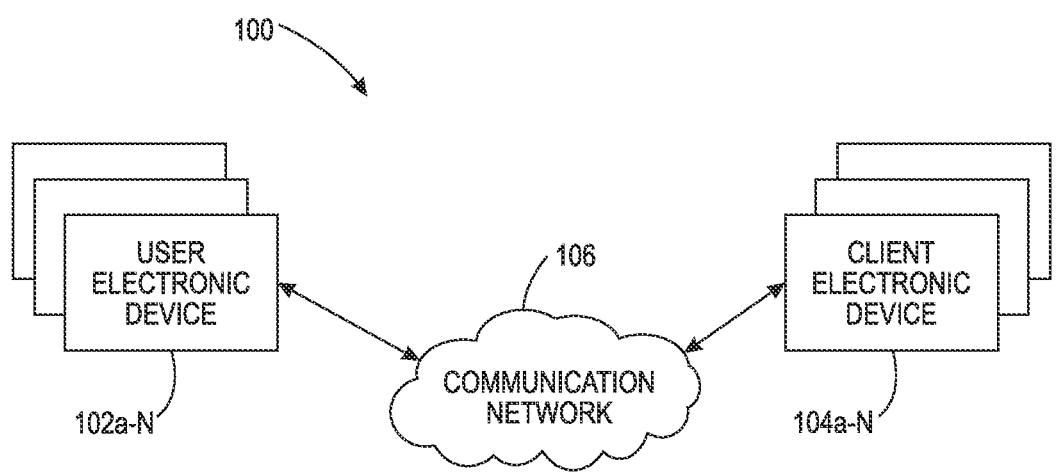
FIG. 1A illustrates an example system for performing intelligent session management.

The following terms shall have, for purposes of this application, the respective meanings set forth below:

A "device policy" refers to an electronic representation of one or more rules that define one or more conditions, triggers and/or actions for one or more user electronic devices.

An "electronic device" or a "computing device" refers to a device that includes a processor and memory. Each device may have its own processor and/or memory, or the processor and/or memory may be shared with other devices as in a virtual machine or container arrangement. The memory may contain or receive programming instructions that, when executed by the processor, cause the electronic device to perform one or more operations according to the programming instructions. Examples of electronic devices include personal computers, servers, mainframes, virtual machines, containers, gaming systems, televisions, and mobile electronic devices such as smartphones, personal digital assistants, cameras, tablet computers, laptop computers, media players and the like. In a client-server arrangement, the client device and the server are each electronic devices, in which the server contains instructions and/or data that the client device accesses via one or more communications links in one or more communications networks. In a virtual machine arrangement, a server may be an electronic device, and each virtual machine or container may also be considered to be an electronic device. In the discussion below, a client device, server device, virtual machine or container may be referred to simply as a "device" for brevity.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

A "multi-function device" (or "MFD") refers to a machine comprising hardware and associated software configured to enable the device to print documents on substrates, as well as perform at least one other function such as copying, facsimile transmitting or receiving, image scanning, or performing other actions on document-based data.

A "print device" refers to a device capable of performing one or more functions, operations and/or services during a session. For example, a print device may perform one or more functions, operations, and/or services on a job, such as, for example, a print job. For example, a print device may provide print-related services for one or more print jobs. A print device may include a printer, scanner, multi-function device or other similar equipment.

A "job" refers to a logical unit of work that is to be completed. In a document management or processing context, a print job may be a specific type of job. For example, a print job may be a request to print, collate, cut, staple, bind, scan, send, or email a document or set of documents.

A "session" refers to a period of time during which there is an interaction with a user electronic device. Example sessions may include processing at least a portion of a job by a user electronic device, personalizing aspects of a home screen of an electronic device, performing diagnostics on a user electronic device, performing maintenance on a user electronic device, other interactions with a user electronic device.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

A "user electronic device" refers to an electronic device that may be used to process at least a portion of a job. A print device, a computer, and a multi-function device are examples of user electronic devices.

The term "user credentials" or "credentials" refers to data or information that a user of an electronic device provides to authenticate the user's identity and gain access to functionality of the electronic device, content accessible via the electronic devices or other resources available via the electronic device. Example user credentials include, without limitation, a user identification (e.g, user name, email address, etc.), a password, a public key infrastructure (PKI) certificate, a token, biometric information, a set of questions, and/or the like.

FIG. 1A shows an example system for performing intelligent session management according to an embodiment. As illustrated by FIG. 1A, a system 100 may include one or more user electronic devices 102a-N and one or more client electronic devices 104a-N. The client devices 104a-N may communicate with one or more of the user electronic devices 102a-N via one or more communication networks 106. A communication network 106 may be a local area network (LAN), a wide area network (WAN), a mobile or cellular communication network, an extranet, an intranet, the Internet and/or the like.

A client electronic device 104a-N may be an electronic device used to submit one or more jobs to a user electronic device 102a-N or otherwise communicate with a user electronic device. For example, in situations where a user electronic device 102a-N is a multi-function device, a client electronic device 104a-N may submit one or more print jobs to the multi-function device. In various embodiments, a client electronic device 104a-N may be mobile electronic device, a laptop computer, a desktop computer, a tablet and/or the like.

In various embodiments, one or more client electronic devices 104a-N may be located on-premises with one or more user electronic devices 102a-N. Alternatively, one or more client electronic devices 104a-N may be located remotely from one or more user electronic devices 102a-N.

Figure 1B:
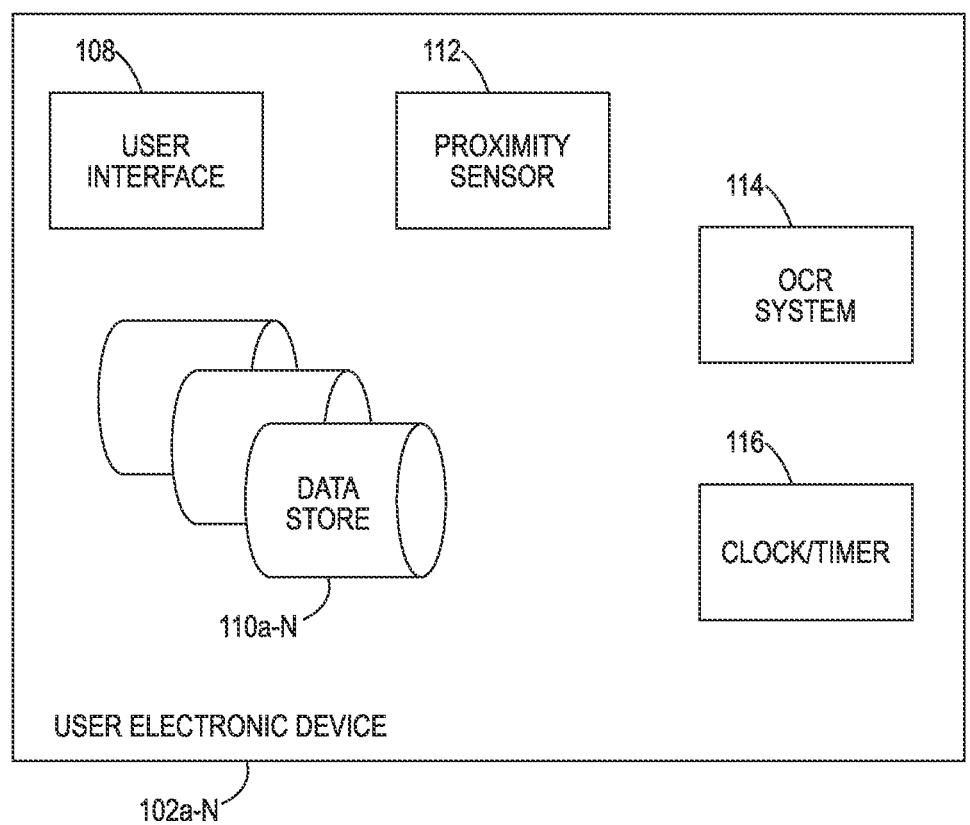
FIG. 1B illustrates example components of a multifunction device.

FIG. 1B illustrates example components of a user electronic device according to various embodiments. A user electronic device may include a user interface 108. The user interface 108 may be used by a user of a user electronic device to provide one or more instructions to the user electronic device. For example, a user may release or otherwise initiate one or more jobs at a user electronic device using a user interface 108. In various embodiments, a user interface 108 may include a display device and an input device. For example, a user interface 108 may include a display screen and a keyboard for providing input. Alternatively, a user interface 108 may include a touch screen.

As illustrated in FIG. 1B, a user electronic device may include, or be in communication with, one or more data stores 110a-N. A data store 110a-N may store information pertaining to one or more users and/or jobs, as described in more detail below.

In various embodiments, a user electronic device may include one or more proximity sensors 112. A proximity sensor 112 may be a device that detects the presence of objects that are near to the user electronic device without physical contact. For example, a proximity sensor 112 of a user electronic device may be able to detect when a user is in proximity to the user electronic device. In various embodiments, a proximity sensor may emit an electromagnetic field or an infrared (IR) light beam. A change or break of the emission may indicate that an object is in proximity.

A user electronic device may include or be in communication with an optical character recognition (OCR) system 114. An OCR system may include a scanner device, such as, for example, an optical scanner, that is configured to read or copy text of a print job and/or one or more data stores. A data store of an OCR system may store one or more processing models which may be applied to at least a portion of the text of a print job in the performance of optical character recognition. Example processing models may be ones associated with performing intelligent character recognition (ICR) or other models associated with identifying phrasing, languages, syntax and/or the like. For example, a processing model may utilize one or more pattern recognition algorithms to recognize text in various forms, formats and/or the like. As another example, a processing model may utilize one or more feature detection algorithms to detect one or more features associated with various characters.

A scanner device may process a physical document and convert the physical document into an electronic version of the document. For example, a scanner may copy a document into a black and white representation of the document, and may analyze the black and white version to identify text and background. Text may appear as a darker portion of the version. The OCR system may further process one or more of the dark portions using one or more processing models to identify specific characters. Once one or more characters are identified, an OCR system may convert the characters to a machine-readable representation.

An OCR system 114 may perform image processing on a received print job to generate a corresponding electronic document. For example, a user electronic device, such as a MFD, may use one or more image sensors to generate an electronic device. For instance, a user electronic device may analyze a physical document (such as one to be scanned by the user electronic device), to generate a two-dimensional or other electronic version. An OCR system 114 may perform OCR on a physical document to generate an electronic document.

In various embodiments, a user electronic device may include a clock and/or timer 116. A clock and/or timer 116 may keep track of the amount of idle time being experienced by a user electronic device. Idle time may refer to time during which a job is not being processed by a user electronic device, time during which a user is not interacting with the user electronic device, time during which the user electronic device is otherwise not receiving or processing information pertaining to a job and/or the like.

Figure 2:
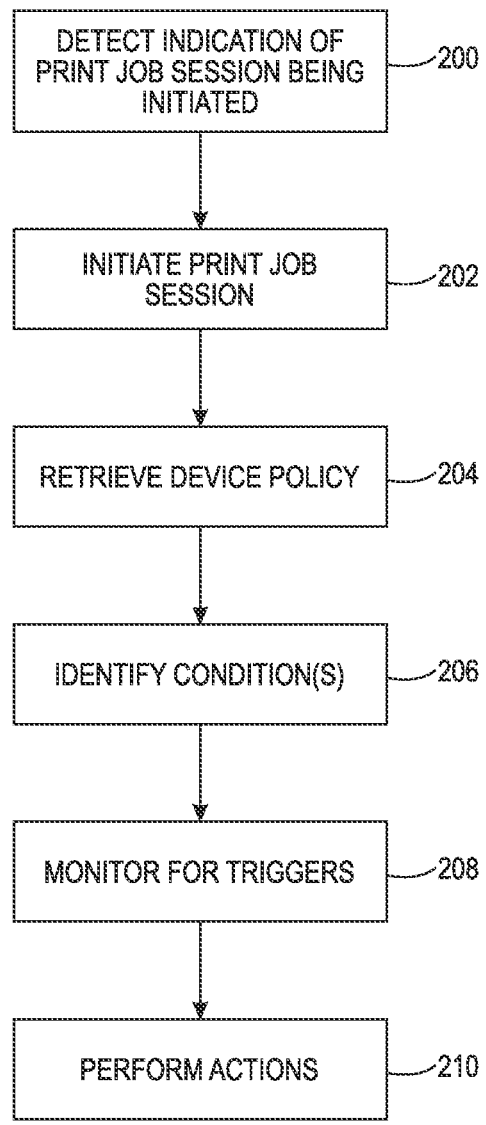
FIG. 2 illustrates an example method of performing intelligent session management by a multifunction device.

FIG. 2 illustrates an example method of performing intelligent session management by a user electronic device according to an embodiment. As shown in FIG. 2, a user electronic device may detect 200 an indication that a session is to be initiated. An indication that a session is to be initiated may be detected by one or more sensors or components of a user electronic device. For example, an indication may be receipt of one or more credentials from a user via a user interface of the user electronic device. As another example, an indication may be receipt of other input from a user via a user interface. For instance, a user may press a button (or an input field on a touch screen) or otherwise make a selection via one or more user electronic device input devices to start a session.

As another example, a user electronic device may detect 200 an indication that a session is to be initiated in response to a proximity sensor of the user electronic device detecting that an object (e.g., a person) is within a certain distance from the proximity sensor. For example, a proximity sensor may detect that a person has approached the user electronic device and may initiate a session in response.

As yet another example, a user electronic device may detect 200 an indication that a session is to be initiated in response to receiving information from an electronic device such as, for example, a client electronic device, a reader device, and/or the like. For example, a user may use a mobile electronic device to remotely initiate a session at a user electronic device. As another example, a user may scan a token such as, for example, a card, a radio frequency identification (RFID) tag, a near field communication (NFC) tag and/or the like by a reader device in order to initiate a session at a user electronic device. Examples of reader devices include, without limitation, RFID readers, NFC readers, barcode scanners, card readers and/or the like.

In response to detecting 200 an indication that a session is to be initiated, a user electronic device may initiate 202 a session. A user electronic device may initiate 202 a session by making one or more resources of the user electronic device available for use by the user. The one or more resources may be ones associated with processing a job. For example, upon logging into a MFD, the MFD may present a user with a menu of services, content, or other resources that are available such as, for example, functionality relating to printing, scanning, binding, collating, and/or the like. As another example, the resources may be ones associated with performing diagnostics or maintenance on a user electronic device.

A user electronic device may retrieve 204 a device policy from one or more data stores. For instance, a user electronic device may retrieve 204 a device policy from a data store of the user electronic device. A device policy may define one or more conditions, triggers and/or responses associated with the user electronic device according to an embodiment, and as further described below. Table 1 below illustrates an example user electronic device policy according to an embodiment.

TABLE 1

| Condition | Trigger | Response |
| --- | --- | --- |
| Logged in | Press start | Prompt to log out |
| Logged in | Printing a secure print job | Automatic log out |
| Admin logged in | Enter device app | Shorten session timer |
| Admin logged in | MFD is idle for 15 seconds | Automatic log out |

A user electronic device may identify 206 one or more conditions from the device policy. A condition refers to one or more roles associated with a user. A role may refer to a designation associated with a user that indicates a level of access, privileges, or permissions granted to the user. The access, privileges, or permissions may pertain to one or more settings or configurations of a user electronic device. As another example, the access, privileges, or permissions may pertain to information that is accessible via a user electronic device. For instance, a user who is associated with an administrator role may have greater permissions or may be able to access information than a different user who is not associated with an administrator role. For instance, a device policy for a user electronic device may specify that a condition exists if a user logs into the user electronic device and holds the role of admin. Additional and/or alternate roles may be used within the scope of this disclosure. A role may be determined based on one or more credentials that are used to access a user electronic device. Example roles may include, for example, an admin role, a logged in role, a guest role and/or the like.

A user electronic device may determine a role associated with a user based on a log-in status associated with a user.

A log-in status refers to whether a particular user has provided one or more user credentials to gain access to a user electronic device. A user who does successfully provide one or more user credentials to gain access to a user electronic device may be considered to have a log-in status of logged in, while a user who does not provide one or more credentials to gain access to an user electronic device may be considered to have a log-in status of logged out.

A user electronic device may determine that user credentials have been received. The user electronic device may authenticate the received user credentials before providing a user access to certain content, functionality or resources of the user electronic device. A user electronic device may authenticate a user by comparing at least a portion of the provided user credentials to at least a portion of known credentials associated with a user. In certain embodiments, a user management system, as discussed below, may be used to authenticate a user.

The user electronic device may, based on received user credentials, determine whether the user is associated with a particular role that corresponds to a target role. For instance, a user management system associated with a user electronic device may compare at least a portion of the received user credentials to information from one or more of its data stores to identify one or more roles associated with one or more users.

A user management system may reside on a user electronic device. Alternatively, a user management system may reside remotely from a user electronic device, but may be in communication with one or more user electronic devices.

A user management system may store information pertaining to the access, privileges and/or permissions of one or more users. For example, a user management system may store the access, privileges and/or permissions of a user such that they are correlated to the user's user credentials, a unique identifier associated with the user and/or the like. In various embodiments, a user management system may store one or more user In various embodiments, the occurrence of a condition may cause a user electronic device to begin monitoring 208 for the occurrence of one or more session triggers. A trigger refers to one or more actions (or lack thereof) that a user may (or may not) perform using a user electronic device in connection with an interaction with the user electronic device. A trigger may also refer to the existence or non-existence of a context or situation. Example triggers may include, without limitation, accessing one or more secure or restricted applications or programs of a user electronic device, entering or leaving an application, completion of a job, switching between applications, requesting that a user electronic device perform one or more functions, specifying one or more settings of a user electronic device, requesting access to restricted content or functionality, and/or the like. For example, a trigger may be that a color output selection has been made. As such, if a user requests that a user electronic device print or otherwise process a print job in color during the session, such as, for example, by setting an output setting of the user electronic device to color output, the user electronic device may determine that a trigger has occurred.

As a further example, a trigger may be a date and/or time. For example, only users having admin roles may performing certain actions after 5 pm on weekdays. Additional and/or alternate roles and/or dates/times may be used within the scope of this disclosure.

A user electronic device may monitor 208 for the occurrence of one or more triggers associated with one or more of the identified conditions during a session. A user electronic device may monitor one or more sensors or components of the user electronic device to determine whether one or more triggers have occurred. For example, referring to Table 1, if a MFD identifies a user being logged in as a condition, it may monitor 208 one or more of its input devices for an indication that a print job is to begin processing. This indication may be received when a user presses a button on the user electronic device (e.g., a start button), selects a touch element on a touch screen display of a user electronic device, uses a different electronic device (e.g., a mobile electronic device, a desktop computer, etc.) to start a job at the user electronic device, and/or otherwise instructs a user electronic device to begin the processing of a job.

In various embodiments, a trigger may involve an OCR system of a user electronic device flagging information or types of information included in a job. For example, an OCR system may perform image processing on a print job that involves identifying one or more terms that are included in the physical document. A term may refer to a word, a phrase, a label and/or the like. For instance, an OCR system may perform OCR or other image processing techniques to identify one or more words from a physical document.

The OCR system may store the identified terms in a data store, such as a database, a table, and/or the like. The data store may be resident on the user electronic device. Alternatively, the data store may be located remotely from the user electronic device and may be in communication with the user electronic device.

In various embodiments, an OCR system may identify one or more terms from the physical document that satisfy one or more rules. For instance, an identified term may be one that is included on a list of terms stored by the OCR system. As another example, an OCR system may identify one or more terms that may be indicative of a category of information. In various embodiments, an OCR system may identify one or more terms that may represent personally identifiable information (PII). PII may include, for example, a full name, a social security number, financial information, passport numbers, driver license numbers, and/or other information that can be used to potentially identify a specific individual. In various embodiments, an OCR system may use one or more machine learning models that have been trained on whether information is PII to determine whether terms from a physical document qualify as PII.

A trigger may involve an OCR system of a user electronic device flagging situations that involve performing one or more actions on one or more file or document types. For example, an OCR system may perform image processing on a print job that involves identifying a document type associated with the print job. Examples of document types may include, without limitation, a tax form, a medical record, a bank record and/or the like.

In various embodiments, an OCR system may identify a document type based on one or more terms present in the print job, a format or layout of the print job, a title of the print job, a description of the print job, metadata associated with the print job and/or the like. In various embodiments, an OCR system may use one or more machine learning models that have been trained on one or more different document types to determine the document type of particular print job.

In response to determining that one or more triggers associated with one or more of the identified conditions have occurred, the user electronic device may perform 210 one or more actions pertaining to the session. In an embodiment, one or more of the actions may pertain to completion of a session such as, for example, ending a session, continuing a session, continuing with processing a job, and/or the like. In various embodiments, an action may involve automatically causing a notification to be displayed on a display device of a user electronic device. The notification may prompt a user to change a setting, end a session, continue a session, and/or the like. For example, a user electronic device may cause a notification to be displayed on a display device of the user electronic device that prompts the user to confirm whether processing of the print job should continue despite the presence of PII.

One or more actions may be specified in the device policy according to an embodiment. For example, referring back to Table 1, if a user logs into a user electronic device and presses a start button to begin a print job, the user electronic device may automatically prompt the user to log out. The user electronic device may cause a visual prompt to be displayed on a user interface of the user electronic device. The user electronic device may cause an audio sound to be played via one or more speakers of the user electronic device as a prompt. Additional and/or alternate prompts may be used within the scope of this disclosure.

As another example, as illustrated in Table 1, if a user selects color output for a print job and presses a start button to begin a print job, the user electronic device may automatically prompt the user to reset the color output setting to black and white. This may help to preserve consumables, such as color ink, and limit the use of such consumables for jobs that truly require them. For instance, if a user electronic device did not prompt a user to reset a color print setting, the user may forget to do so on his or her own, and the next user of the user electronic device may print in color when color was not needed.

As yet another example, if a user is printing a secure print job, the user electronic device may automatically log the user out of the user electronic device upon completion of the print job to prevent others from accessing the print job should the user neglect to logout on his or her own. A secure print job refers to a print job that requires that a user provide authorization to a user electronic device before proceeding with processing of the print job. A user may provide authorization by providing, for example, a personal identification number, a biometric, one or more user credentials, and/or the like.

Other examples of actions that may be taken by a user electronic device include, without limitation, notifying a user that they are logged in, prompting a user to end a session, prompting a user to continue a session, and/or the like.

In various embodiments, if an OCR system determines that a job may include PII, or that a job may be of a certain document type, the user electronic device may prompt a user to confirm that the job should continue processing or should be canceled.

Figure 3:
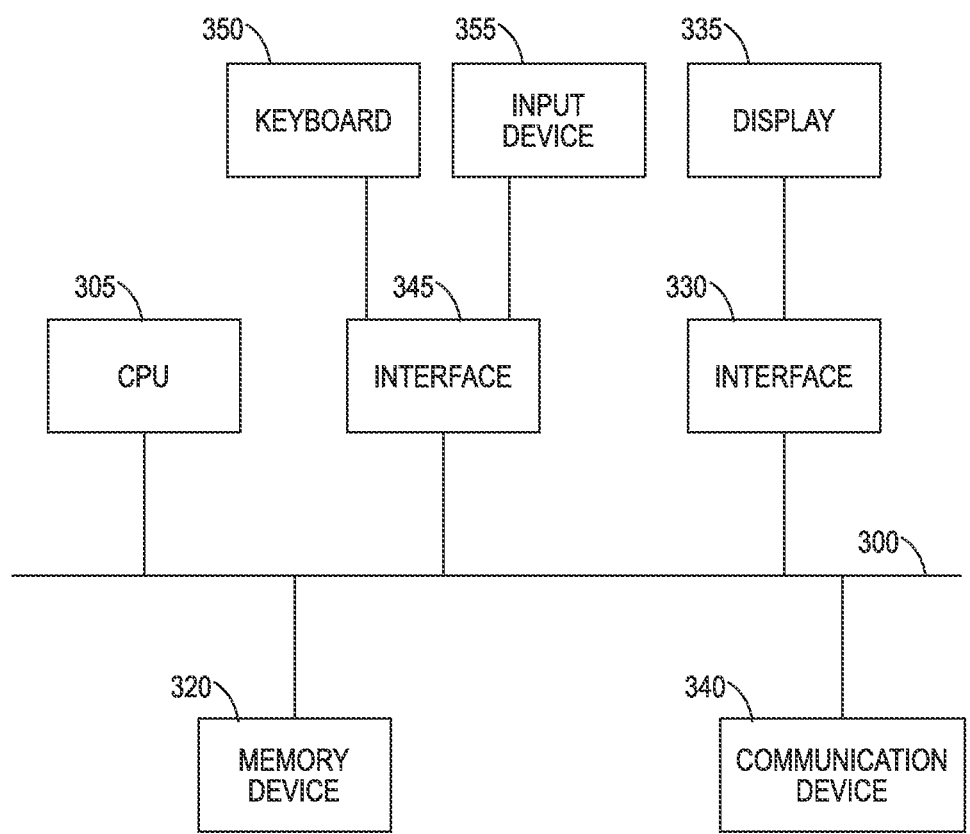
FIG. 3 illustrates a block diagram of example hardware that may be used to contain or implement program instructions according to an embodiment.

FIG. 3 depicts a block diagram of hardware that may be used to contain or implement program instructions, such as those of a cloud-based server, electronic device, virtual machine, or container. A bus 300 serves as an information highway interconnecting the other illustrated components of the hardware. The bus may be a physical connection between elements of the system, or a wired or wireless communication system via which various elements of the system share data. Processor 305 is a processing device that performs calculations and logic operations required to execute a program. Processor 305, alone or in conjunction with one or more of the other elements disclosed in FIG. 3, is an example of a processing device, computing device or processor as such terms are used within this disclosure. The processing device may be a physical processing device, a virtual device contained within another processing device, or a container included within a processing device.

A memory device 320 is a hardware element or segment of a hardware element on which programming instructions, data, or both may be stored. Read only memory (ROM) and random access memory (RAM) constitute examples of memory devices, along with cloud storage services.

An optional display interface 330 may permit information to be displayed on the display 335 in audio, visual, graphic or alphanumeric format. Communication with external devices, such as a printing device, may occur using various communication devices 340, such as a communication port or antenna. A communication device 340 may be communicatively connected to a communication network, such as the Internet or an intranet.

The hardware may also include a user input interface 345 which allows for receipt of data from input devices such as a keyboard or keypad 350, or other input device 355 such as a mouse, a touch pad, a touch screen, a remote control, a pointing device, a video input device and/or a microphone. Data also may be received from an image capturing device 310 such as a digital camera or video camera. A positional sensor 315 and/or motion sensor 365 may be included to detect position and movement of the device. Examples of motion sensors 365 include gyroscopes or accelerometers. An example of a positional sensor 315 is a global positioning system (GPS) sensor device that receives positional data from an external GPS network.

The features and functions described above, as well as alternatives, may be combined into many other different systems or applications. Various alternatives, modifications, variations or improvements may be made by those skilled in the art, each of which is also intended to be encompassed by the disclosed embodiments.

What is claimed is:

1. A method of performing multifunction device session management, the method comprising:
   by a multifunction device:
      receiving user credentials comprising an indication that a session is to be initiated,
      identifying one or more roles based on the received user credentials, the one or more roles indicating a level of access, privileges, or permissions, and
      in response to receiving the indication that the session is to be initiated, initiating the session based on the indicated level of access, privileges, or permissions,
      retrieving a device policy associated with the multifunction device,
      identifying a condition from the device policy,
      monitoring for the occurrence of one or more triggers during the session, wherein each trigger is associated with the identified condition from the device policy, and
      in response to detecting that one or more of the triggers have occurred at the multifunction device, performing one or more actions pertaining to completion of the session.

2. The method of claim 1, further comprising by the multifunction device:
   receiving, by the wireless interface of the multifunction device, an indication that a print job is to begin processing; and
   in response to receiving the indication that the print job is to begin processing, processing the print job.

3. The method of claim 1, wherein monitoring for the occurrence of one or more triggers during the session comprises monitoring for one or more triggers from a mobile electronic device.

4. The method of claim 1, further comprising by the multifunction device:
in response to detecting that one or more of the triggers have occurred at the multifunction device, causing an audio sound to be played via one or more speakers of the multifunction device.

5. The method of claim 1, wherein receiving user credentials by the wireless interface of the multifunction device comprises receiving user credentials from a mobile electronic device.

6. The method of claim 1, wherein receiving information by the wireless interface of the multifunction device comprises receiving user credentials by a reader device of the multifunction device.

7. The method of claim 6, wherein the reader device comprises a Radio-Frequency Identification (RFID) reader or a Near-Field Communication (NFC) reader.

8. The method of claim 1, wherein receiving user credentials by the wireless interface of the multifunction device comprises receiving credentials from a user token.

9. The method of claim 8, wherein the user token comprises a personal identification number, barcode, RFID tag, or NFC tag.

10. The method of claim 1, wherein the user credentials comprise a public key infrastructure (PKI) certificate.

11. The method of claim 1, further comprising:
performing, by an optical character recognition system associated with the multifunction device, image processing on at least a portion of a print job to determine whether the print job contains personally identifiable information, and
in response to the print job containing personally identifiable information, ending the session.

12. A system for performing multifunction device session management, the system comprising:
a multifunction device; and
a computer-readable storage medium comprising one or more programming instructions that, when executed, will cause the multifunction device to:
receive user credentials comprising an indication that a session is to be initiated,
identify one or more roles based on the received user credentials, the one or more roles indicating a level of access, privileges, or permissions, and
in response to receiving the indication that the session is to be initiated, initiate the session based on the indicated level of access, privileges, or permissions,
retrieve a device policy associated with the multifunction device,
identify a condition from the device policy,
monitor for the occurrence of one or more triggers during the session, wherein each trigger is associated with the identified condition from the device policy, and
in response to detecting that one or more of the triggers have occurred at the multifunction device, perform one or more actions pertaining to completion of the session.

13. The system of claim 12, wherein the one or more programming instructions further cause the multifunction device to:
receive, by the wireless interface of the multifunction device, an indication that a print job is to begin processing; and
in response to receiving the indication that the print job is to begin processing, process the print job.

14. The system of claim 12, wherein the one or more programming instructions that, when executed, will cause the multifunction device to monitor for the occurrence of one or more triggers during the session comprise one or more programming instructions that, when executed, will cause the multifunction device to monitor for one or more triggers from a mobile electronic device.

15. The system of claim 12, wherein the one or more programming instructions will further cause the multifunction device to:
in response to detecting that one or more of the triggers have occurred at the multifunction device, cause an audio sound to be played via one or more speakers of the multifunction device.

16. The system of claim 12, wherein the one or more programming instructions that, when executed, will cause the multifunction device to receive user credentials by the wireless interface of the multifunction device comprise one or more programming instructions that, when executed, will cause the multifunction device to receive user credentials from a mobile electronic device.

17. The system of claim 12, wherein the one or more programming instructions that, when executed, will cause the multifunction device to receive user credentials by the wireless interface of the multifunction device comprise one or more programming instructions that, when executed, will cause the multifunction device to receive user credentials by a reader device of the multifunction device.

18. The system of claim 17, wherein the reader device comprises a Radio-Frequency Identification (RFID) reader or a Near-Field Communication (NFC) reader.

19. The system of claim 12, wherein the one or more programming instructions that, when executed, will cause the multifunction device to receive user credentials by the wireless interface of the multifunction device comprise one or more programming instructions that, when executed, will cause the multifunction device to receive credentials from a user token.

20. The system of claim 19, wherein the user token comprises a barcode, RFID tag, or NFC tag.

21. The system of claim 12, wherein the user credentials comprise a public key infrastructure (PKI) certificate.

22. The system of claim 12, wherein the programming instructions will further cause the multifunction device to:
perform, by an optical character recognition system associated with the multifunction device, image processing on at least a portion of a print job to determine whether the print job contains personally identifiable information, and
in response to the print job containing personally identifiable information, end the session.

* * * * *